April 26, 1949.  R. J. SCHWEIBINZ  2,468,411
FILM DEVELOPING HOLDER
Filed Oct. 16, 1946  3 Sheets-Sheet 3
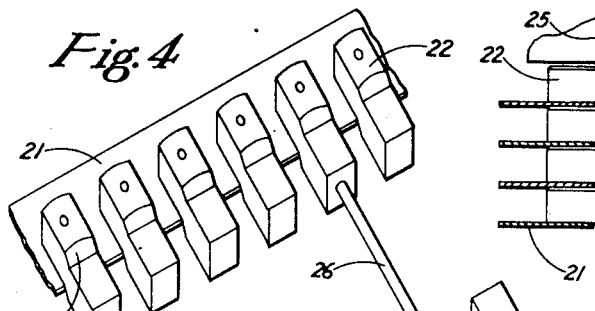
Fig. 4
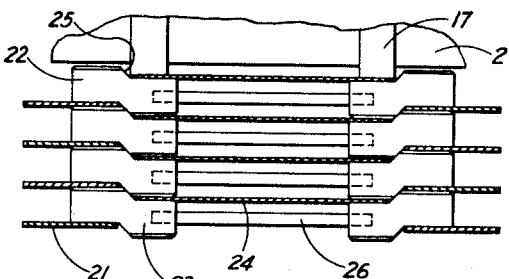
Fig. 5
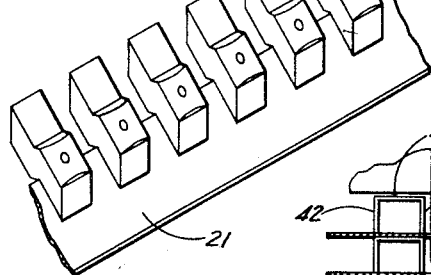
Fig. 7
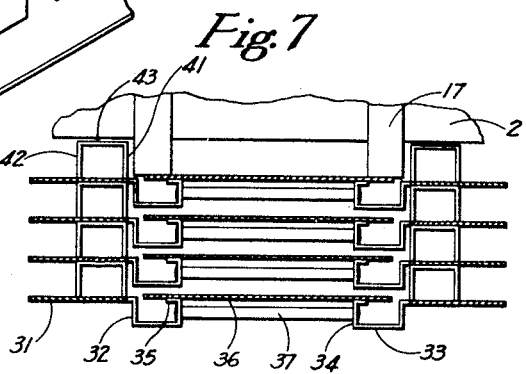
Fig. 6
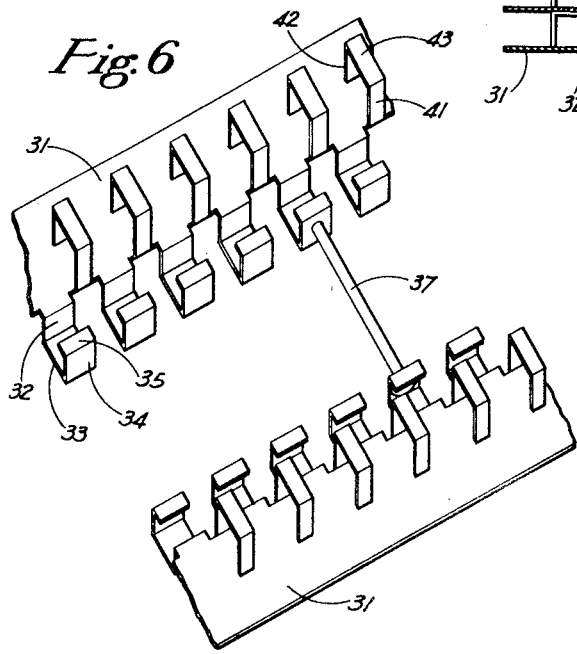
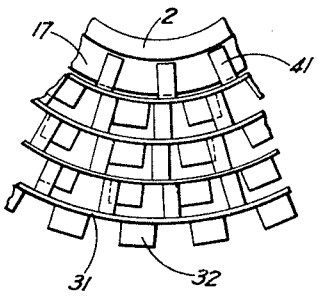
Fig. 8
Inventor
Raymond J. Schweibinz
By Brown, Critchlow, Flick & Peckham
his Attorneys Patented Apr. 26, 1949

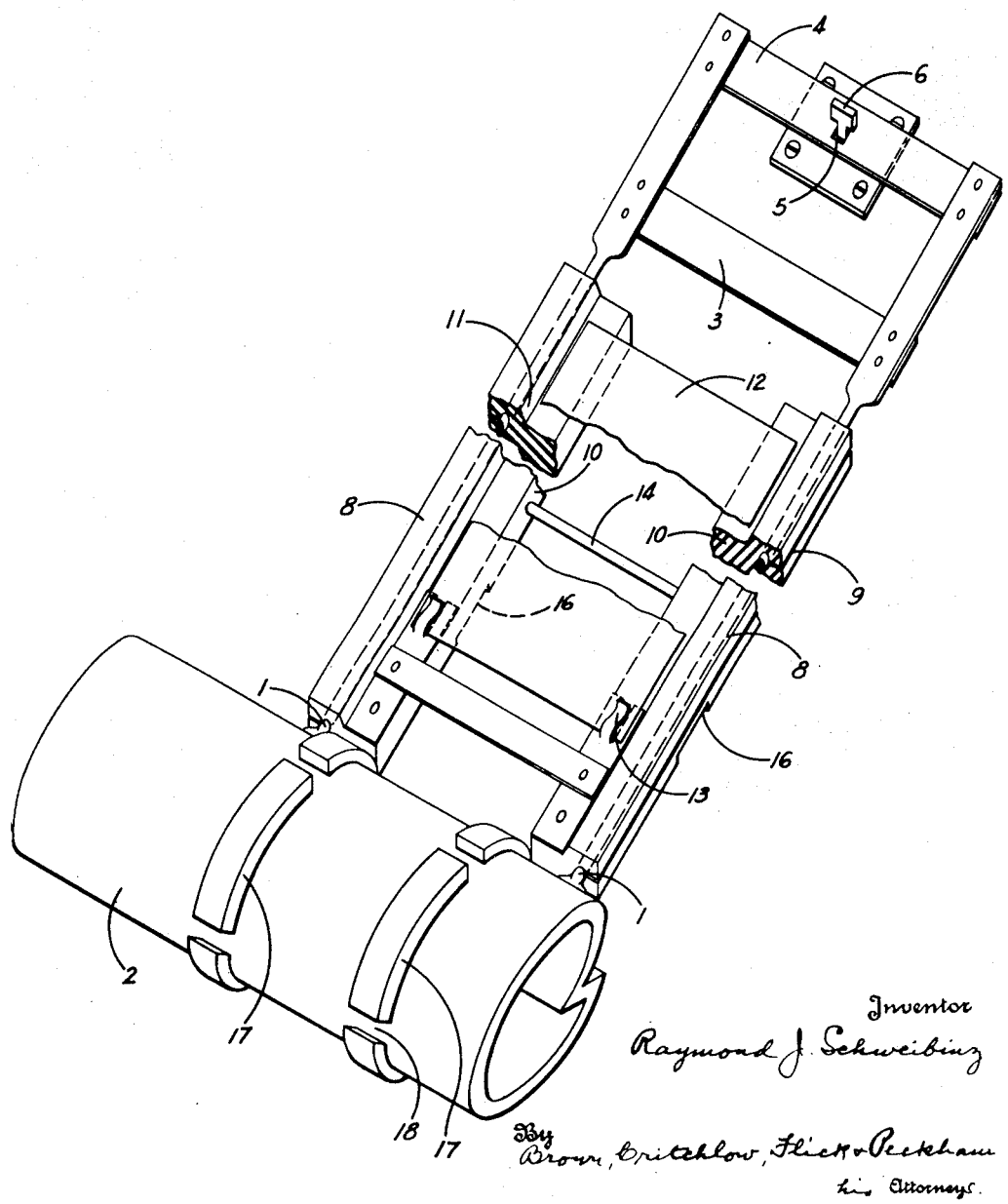

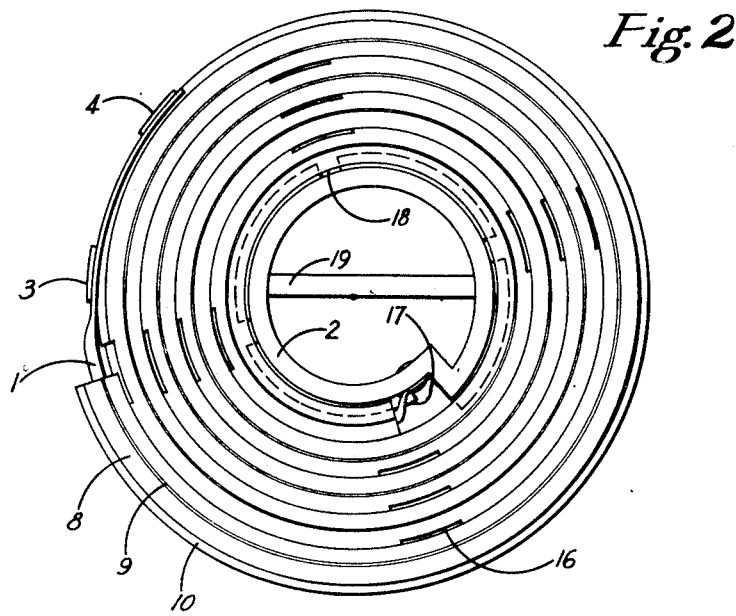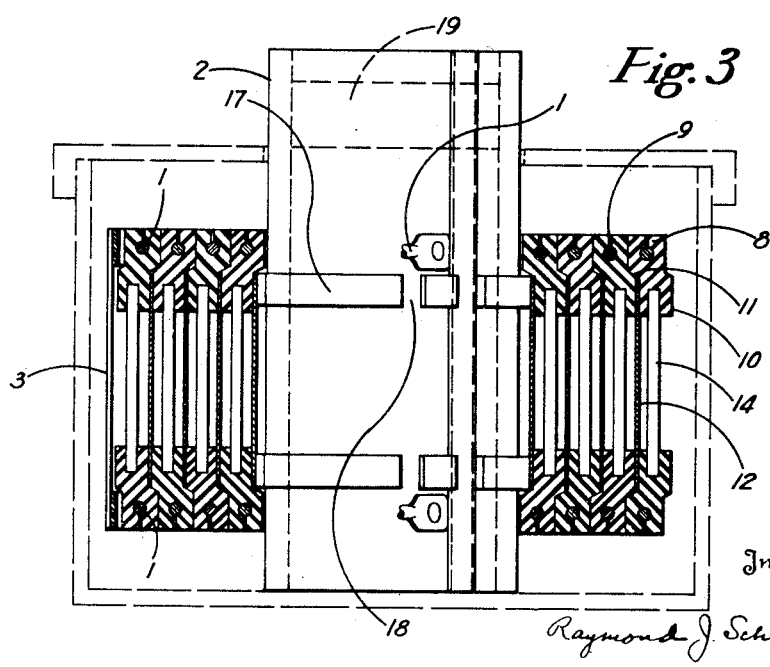

2,468,411

UNITED STATES PATENT OFFICE 2,468,411

FILM DEVELOPING HOLDER

Raymond J. Schweibinz, Homeville, Pa.

Application October 16, 1946, Serial No. 703,629

9 Claims. (Cl. 95—100)

This invention relates to holders for exposed photographic films during developing, and more particularly to holders for color film.

Many different devices have been proposed and used for holding photographic film while it is being developed. For amateur use these often include a reel in which a length of film is wound and held in the developing solution. Such reels may be satisfactory in some cases for black and white film, but for color films they are not so good. This is because during the processing of a color film it must be removed from the reel and exposed to the light, which is called "flashing," and then be returned to the reel. As the film is wet at that time, it is very difficult to wind it back in the reel. Also proposed have been film holders in the form of a straight flexible band on which a straight length of film is laid. Then the band is rolled up into a coil with the film coiled with it. Such bands have not been easy to handle, and they mar the film and interfere with proper developing of some areas of it.

It is among the objects of this invention to provide a film developing holder of simple construction which is satisfactory for the processing of color films, which permits a color film to be flashed without being removed entirely from the holder, which is easy to handle, which does not touch the picture-carrying area of the film, and in which a wet film can be wound as easily as a dry film.

In accordance with this invention a pair of parallel tracks are held in predetermined spaced relation and are formed for supporting a length of film by its margins only. The tracks are flexible and adapted to be rolled into a coil having the film coiled between its convolutions. The tracks preferably have shoulders or the like for engaging the opposite edges of the film to hold it in proper position on the tracks. The tracks are thick enough to separate the convolutions of the coil of film sufficiently to prevent those convolutions from touching one another. The thickness of the means by which the tracks are held in spaced relation is less than the distance between the convolutions of the coiled film, so that the film will not be touched by such connecting means. Connected to each track is spring means for rolling the track into a coil automatically whenever the tracks are not forcefully uncoiled and held straight. Preferably, the spring means consists of a pair of parallel spring wires or bands normally in the form of spirals and to each of which one of the tracks is connected. The inner ends of the spirals may be connected to a spool encircled by the springs, tracks and film. When the outer ends of the springs are held by a support and the spool is moved laterally away from them, the tracks are uncoiled and laid out straight to permit a film to be laid on the tracks or to be removed from them.

The invention is illustrated in the accompanying drawings in which Fig. 1 is a perspective view, broken away, of my film holder uncoiled and laid out straight; Fig. 2 is a reduced plan view of the holder coiled up; Fig. 3 is a side view of the spool with the coiled tracks and film shown in vertical section; Fig. 4 is a fragmentary perspective view of a modified track; Fig. 5 is a tranverse section through a portion of this track when coiled; Fig. 6 is a fragmentary perspective view of another embodiment; Fig. 7 is a view similar to Fig. 5 of this third form; and Fig. 8 is a fragmentary plan view of the coiled track.

Referring to Fig. 1 of the drawings, for the sake of clearness the film holder first will be described while it is uncoiled and laid out straight. In this position the flattened inner ends of a pair of spaced, parallel, spring wires 1 are secured a predetermined distance apart to a spool 2 which may be held by the hand of the person who is developing films. The outer end portions of the two wires likewise are flattened and are connected by a pair of spaced bars 3 and 4 the outer one of which is provided with a central transverse slot 5. If not restrained, these wires will wrap themselves around the spool and thereby form two parallel spirals. Therefore, to hold the wires out straight the slot 5 is slipped over a T-shape hook 6 secured to a table or other support (not shown), and then turned 90° to lock the outer bar 4 on the hook. After this is done the spool is rolled away from the hook to permit the encircling wires to unwind and lay straight as shown. If the spool is released, the spring wires will roll it back toward the hook and it then will extend through the centers of the two spirals formed by the wires coiled around it.

Extending along each wire is a flexible track which may be rubber having a body 8 provided with a longitudinal slot 9 that permits it to be slipped over the wire. Each of these tracks has a film-supporting portion 10 integral therewith projecting a short distance across the space between the two wires. This portion is offset relative to its body to which it is connected by an inclined shoulder 11. The shoulders are spaced apart such a distance that an exposed film 12 will fit between them, and therefore they guide the film to a seat on the tracks and prevent it from moving transversely to any appreciable degree. The track projections 10 extend only far enough into the space between the wires to engage the margins of a film where the pictures will not appear. The inner end of the film may be held by spring clips 13 mounted on the inner ends of the tracks. In order to hold the wires and tracks the proper distance apart, across members, such as rods 14, are placed between them at intervals with the ends of the rods molded in the tracks. These cross rods also prevent the tracks from rotating on the wires. The rods are materially thinner than the track projections 10 and are located about midway between the planes of the opposite surfaces of those projections so that the rods will not touch the area of the film between the tracks.

When the spring wires are allowed to coil the tracks and film around the spool, as shown in Figs. 2 and 3, the outside of each convolution of the offset track projections 10 will seat against the encircling convolution of film and hold it between the track shoulders 11. Thus, the film-supporting portions of each convolution nest with those of the encircling convolution. The inclined shoulders guide the adjoining track convolutions into proper relation and hold them there with the film locked between the convolutions.

To permit developing solution to flow between the coiled tracks, they are provided at intervals with shallow passages in the form of shallow slots 16 across one surface. The inside of the inner convolution of the coil of film is held against the track and spaced from the spool by means of a pair of ribs 17 which encircle the spool. These ribs are slightly higher than the track shoulders so that the track will be spaced from the spool to allow developing solution to flow between the track and spool and then through breaks 18 in the ribs into the space between them. The body of the spool preferably is spiral in cross section so that the first turn of the tracks around it likewise will be spiral. The same effect can be produced with a circular spool by making the ribs progressively higher from one end to the other.

After a film has been laid on the tracks as shown in Fig. 1, the spool is released sufficiently to allow the springs to roll the tracks into a spiral. The coil then may be placed in a developing tank, indicated in broken lines in Fig. 3, and rotated in well known manner by a key engaging a crosspiece 19 in the upper end of the spool. Following this, the coil is removed from the tank and slot 5 in bar 4 is hooked onto hook 6 as explained previously. The spool then is rolled away from the hook to straighten the track so that the film can be lifted from it either for removal or for flashing. If the film is to be put back in a solution, the film is laid back onto the track and the springs are allowed to coil it around the spool again. It will be seen that dampness of the tracks or of the film will cause no trouble.

In the modification of the invention, shown in Figs. 4 and 5, flat spring ribbons or bands 21 are substituted for the spring wires of Fig. 1, and each track is formed from a plurality of laterally spaced lugs 22 secured to the band at longitudinally spaced points along it. Each lug has a portion 23 that projects only a short distance across the space between the bands so that it will engage only the margin of a film 24. This projecting portion is connected to the rest of the lug by an inclined shoulder 25 that substantially engages the edge of the film. At intervals along the bands, opposing lugs are connected by cross members 26 which are thinner than the projecting portions of the lugs and are spaced between their film engaging surfaces so that the cross members will not touch the film. Developing solution can flow between lugs into the space between the film convolutions when the spring bands are allowed to coil up the film.

In another embodiment of the invention, shown in Figs. 6 to 8, spring bands 31 are used, but instead of connecting separate lugs to them, integral lugs are formed by stamping them out of the inner edges of the bands. Each lug has an inner portion 32 bent at right angles to the band, a portion 33 in a plane parallel to the plane of the band, an outer portion 34 parallel to inner portion 32, and then an end 35 that is turned back towards the ribbon in about the same plane. A lug formed in this way has depth which spaces the convolutions of the film 36 apart. As in the other embodiments, the lugs project across the space between the bands only far enough to engage the margins of the film. At intervals, outer portions 34 of the opposing lugs are connected by small cross pieces 37 which do not touch either surface of the film.

To help form a track in which the film cannot move transversely, tongues are stamped out of the inner edges of the bands between the lugs and are bent in the opposite direction from the lugs. Thus, each tongue has parallel portions 41 and 42 perpendicular to the spring band and connected by a portion 43 parallel to the band and overlying it. The perpendicular portions 41 of these tongues form shoulders that can be engaged by the opposite edges of the film. The tongues also space the convolutions of the bands apart.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A film developing holder comprising a pair of spaced parallel flexible tracks having surfaces for supporting a length of film by its margins only, spring means secured to the tracks and tending to roll said tracks into a coil with the film coiled between its convolutions, and cross members extending across the space between said tracks for connecting them, said members being thinner than said tracks and spaced from the planes of the film-engaging surfaces thereof, whereby the film is spaced from said members.

2. A film developing holder comprising a spool, a pair of spaced parallel spiral springs coiled around said spool with their inner ends connected thereto, track elements projecting from said springs a short distance across the space between them for spacing apart the convolutions of an exposed film coiled around the spool between the springs, said elements having narrow surfaces for engaging the opposite sides of the margins only of said film convolutions, and cross members extending across said space at intervals with their opposite ends connected to said elements, said members being thinner than said elements and being positioned to space themselves from the film, and said springs being adapted to be uncoiled manually from around said spool to receive or release the film.

3. A film developing holder comprising a spool, a pair of spaced parallel spiral springs coiled around said spool with their inner ends connected thereto, track elements projecting from said springs a short distance across the space between them for spacing apart the convolutions of an exposed film coiled around the spool between the springs, said elements having narrow surfaces for engaging the opposite sides of the margins only of said film convolutions, means on said spool for spacing the inner convolution of the film from it and formed to engage the margins only of the film, and cross members extending across said space at intervals with their opposite ends connected to said projecting elements and said springs being adapted to be uncoiled manually from around said spool to receive or release the film.

4. A film developing holder comprising a pair of spaced parallel spiral springs, track elements projecting from said springs a short distance across the space between them for spacing apart the convolutions of a spirally wound exposed film between the springs, said elements having narrow surfaces for engaging the opposite sides of the margins only of said film convolutions, cross members extending across said space at intervals with their opposite ends connected to said elements, and means connected to the outer ends of the springs and formed for connection to a support to hold said outer ends while the springs are being uncoiled to release a film from the holder.

5. A film developing holder comprising a pair of spaced parallel spiral springs, track elements projecting from said springs a short distance across the space between them for spacing apart the convolutions of a spirally wound exposed film between the springs, said elements having narrow surfaces for engaging the opposite sides of the margins only of said film convolutions, gripping means adjacent only the inner ends of the springs for engaging and holding the inner end of the film, and cross members extending across said space at intervals with their opposite ends connected to said elements, said members being thinner than said elements and being positioned to space themselves from the film, and said springs being adapted to be uncoiled manually in order to receive or release the film.

6. A film developing holder comprising a pair of spaced parallel spiral spring wires, a flexible member having a body extending along and surrounding each wire and having a portion projecting a short distance across the space between the wires, the projecting portions of the two members being adapted to project between and space apart the convolutions of a spirally wound exposed film between the wires and having surfaces for engaging the opposite sides of the margins only of said film convolutions, said projecting portions being offset radially relative to their bodies to form shoulders for engagement by the opposite edges of the film to hold it against transverse movement, and cross bars extending across said space at intervals with their opposite ends connected to said members, said bars being thinner than said projecting portions of said members.

7. A film developing holder comprising a pair of spaced parallel spiral spring ribbons, a plurality of lugs secured to each ribbon at points spaced longitudinally along it, each of said lugs having a portion projecting a short distance across the space between the ribbons, the projecting portions of the lugs on both ribbons being adapted to space apart the convolutions of a spirally wound exposed film between the ribbons and being short enough to engage the opposite sides of the margins only of said convolutions, and cross bars extending across said space at widely spaced intervals with their opposite ends connected to adjoining lugs, said bars being thinner than said projecting portions of the lugs and being positioned to space themselves from the film.

8. A film developing holder comprising a pair of spaced parallel spiral spring ribbons, a plurality of lugs secured to each ribbon at points spaced longitudinally along it, each of said lugs having a portion projecting a short distance across the space between the ribbons, the projecting portions of the lugs on both ribbons being adapted to space apart the convolutions of a spirally wound exposed film between the ribbons and being short enough to engage the opposite sides of the margins only of said convolutions, and being offset radially of the spiral ribbons to form shoulders adapted to engage the opposite edges of the film to keep it from moving transversely, and cross bars extending across said space at widely spaced intervals with their opposite ends connected to adjoining lugs, said bars being thinner than said projecting portions of the lugs and being positioned to space themselves from the film.

9. A film developing holder comprising a pair of spaced parallel spiral spring ribbons, a plurality of lugs integrally connected to each ribbon at points spaced longitudinally along it and projecting a short distance across the space between the ribbons, said lugs on both ribbons being adapted to space apart the convolutions of a spirally wound exposed film between the ribbons and being short enough to engage the opposite sides of the margins only of said convolutions, a plurality of tongues integrally connected to each ribbon at points spaced longitudinally thereof and extending substantially perpendicularly therefrom, said tongues being adapted to be engaged by the adjacent edge of the film to keep it from moving transversely, and cross members extending across said space at widely spaced intervals with their opposite ends connected to adjoining lugs, said members being thinner than the inner ends of said lugs and being positioned to space themselves from the film.

RAYMOND J. SCHWEIBINZ.

REFERENCES CITED

The following references are of record in the file of this patent:

UNITED STATES PATENTS

| Number | Name | Date |
|---|---|---|
| 790,532 | Shaw | May 23, 1905 |
| 834,463 | Fennell | Oct. 30, 1906 |
| 998,182 | Judd | July 18, 1911 |
| 1,294,429 | Edelman | Feb. 18, 1919 |
| 1,621,291 | Unger | Mar. 15, 1927 |

FOREIGN PATENTS

| Number | Country | Date |
|---|---|---|
| 21,335 | Great Britain | July 5, 1905 |